(12) United States Patent
Gotou et al.

(10) Patent No.: US 8,278,882 B2
(45) Date of Patent: Oct. 2, 2012

(54) CHARGING MONITOR

(75) Inventors: Kiyoshi Gotou, Amagasaki (JP); Hiroaki Koshin, Toyonaka (JP); Hiroshi Ooya, Tsu (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 12/669,613

(22) PCT Filed: Jul. 23, 2008

(86) PCT No.: PCT/JP2008/063197
§ 371 (c)(1),
(2), (4) Date: Jan. 19, 2010

(87) PCT Pub. No.: WO2009/014143
PCT Pub. Date: Jan. 29, 2009

(65) Prior Publication Data
US 2010/0194354 A1    Aug. 5, 2010

(30) Foreign Application Priority Data

Jul. 24, 2007  (JP) ................... 2007-192245
Jul. 24, 2007  (JP) ................... 2007-192246
Jul. 24, 2007  (JP) ................... 2007-192247

(51) Int. Cl.
*H02J 7/06* (2006.01)
*H02J 7/24* (2006.01)
*H02H 3/00* (2006.01)
*H02H 7/00* (2006.01)

(52) U.S. Cl. ........ 320/163; 320/111; 320/162; 320/164; 361/1; 361/93.1; 363/47

(58) Field of Classification Search .......... 320/163, 320/111
See application file for complete search history.

(56) References Cited

U.S. PATENT DOCUMENTS

| 3,213,321 | A | * | 10/1965 | Dalziel | ................... 361/46 |
| 3,690,313 | A | * | 9/1972 | Weppner et al. | ............ 600/508 |
| 3,700,967 | A | * | 10/1972 | Hoss | ........................ 361/46 |
| 4,216,515 | A | * | 8/1980 | Van Zeeland | ............... 361/45 |
| 6,151,228 | A | * | 11/2000 | Miyazaki et al. | ........... 363/48 |
| 6,690,230 | B2 | * | 2/2004 | Pelly | ........................ 327/552 |

(Continued)

FOREIGN PATENT DOCUMENTS

DE    3230557    2/1984

(Continued)

OTHER PUBLICATIONS

Russia Office Action, dated Mar. 10, 2011 (together with an English language translation).

(Continued)

*Primary Examiner* — Drew A Dunn
*Assistant Examiner* — Nathaniel Pelton
(74) *Attorney, Agent, or Firm* — Greenblum & Bernstein, P.L.C.

(57) ABSTRACT

A charging monitor has a switch disposed between a load section having a storage battery and an external AC power supply supplying a current to the load section via a plurality of lines and interrupts the supply of the current from the external AC power supply to the load section; a current detection circuit; a suppression circuit that suppresses a DC component contained in the detection signal; a filter circuit that filters a plurality of frequency components contained in the detection signal so that attenuation increases as a frequency becomes high; a rectifier smoothing circuit that rectifies and smoothens an output signal; and an electric leakage determination circuit that detects an electric leakage and shuts off the switch.

19 Claims, 6 Drawing Sheets

U.S. PATENT DOCUMENTS

| | | | |
|---|---|---|---|
| 7,834,636 B2 * | 11/2010 | Lewinski et al. | 324/509 |
| 2006/0021098 A1 * | 1/2006 | Tezuka | 903/922 |
| 2007/0108945 A1 | 5/2007 | Ohashi et al. | |
| 2008/0073135 A1 * | 3/2008 | Oyobe et al. | 180/65.4 |
| 2008/0174269 A1 * | 7/2008 | DeRome et al. | 320/110 |
| 2009/0009142 A1 * | 1/2009 | Nishikawa | 320/148 |
| 2010/0033140 A1 * | 2/2010 | Otake | 320/165 |

FOREIGN PATENT DOCUMENTS

| | | |
|---|---|---|
| EP | 0106045 | 4/1984 |
| JP | 53-147943 | 12/1978 |
| JP | 54-120844 | 9/1979 |
| JP | 54-121175 | 9/1979 |
| JP | 59-051431 | 3/1984 |
| JP | 07-123517 | 5/1995 |
| JP | 7-123517 | 5/1995 |
| JP | 09-247844 | 9/1997 |
| JP | 11-205909 | 7/1999 |
| JP | 2000-102158 | 4/2000 |
| JP | 2004-227809 | 8/2004 |

OTHER PUBLICATIONS

Canadian Office Action, dated Aug. 26, 2011, for corresponding Canadian Patent Application No. 2,693,300.

* cited by examiner

FIG. 7

CHARGING MONITOR

TECHNICAL FIELD

The present invention relates to a charging monitor, which is interposed between a load section having a storage battery and an external AC power supply and has an electric leakage determination circuit and a switch for disconnecting the load section from the external AC power supply when the electric leakage determination circuit determines that electric leakage has occurred.

BACKGROUND ART

There has conventionally been known an auxiliary power supply system that is capable of, if needed, pulling out electric power accumulated in a battery or an electric vehicle driven by electric power of a battery. A battery provided to such device is charged mainly by a household or industrial external AC power supply. In this case, an electric leakage might occur at the time of charging, due to a poor connection between the charging line and the device or an insulation defect caused around the battery of the device. It is desired that such electric leakage is detected in an early stage for the reason of an electric shock, breakdown of the device, and detraction of the charging efficiency. Moreover, in a structure where the device is insulated from the ground, an electric charge caused by electric leakage at the time of charging flows to the ground through a human body, causing a discomfort feeling.

Patent Document 1 discloses a charging circuit that has an earth-leakage breaker for detecting a leakage at the time of charging, and a wall socket. This earth-leakage breaker is provided between an external power supply and a charge relay of an electric vehicle has a hall element, an early-leakage relay, and a detecting circuit. The hall element outputs an electric signal when a charging circuit is short-circuited, and the detecting circuit brings the earth-leakage relay from its closed stated into an opened state to break the charging circuit, in response to the voltage signal from the hall element. However, in Patent Document 1, the detecting circuit is not for detecting a minute earth leakage but for detecting the presence/absence of short circuit of the charging circuit.

As a device for detecting a minute earth leakage, there has conventionally been known an earth-leakage monitor that has a residual current transformer on each of two AC lines from an external AC power supply, and detects the difference between the currents flowing through these lines, to detect a current leakage.

Incidentally, as a charge control circuit for charging a storage battery in general, a circuit for once charging an alternating current from an external AC power supply, or an inverter circuit having a high-frequency switching circuit or the like for performing voltage conversion and then charging is adopted. When performing charging by means of these types of charge control circuits, an excess current temporarily flows through a noise suppression capacitor or the like in order to absorb and balance the voltage difference between the external AC power supply and the storage battery, when the external AC power supply and the storage battery are connected to each other or when charging is started. As a result, there is a risk that the earth-leakage monitor malfunctions. In the prior art, measures for this matter are not taken, and therefore the accuracy of earth-leakage detection has a certain limitation in terms of preventing the malfunction. A similar problem can occur in household, commercial or industrial battery charging that is used in the fields other than a field of charging an in-vehicle battery.

Patent Document 1: Japanese Patent Application Publication No. H11-205909

DISCLOSURE OF THE INVENTION

An object of the present invention is to provide a charging monitor that is capable of preventing false detection caused by a temporarily excess current on the load side that is generated by starting charging when charging a battery as a load section from an external AC power supply, so that a minute electric leakage can be detected.

A charging monitor according to one aspect of the present invention, having: a switch that is disposed between a load section having a storage battery and an external AC power supply supplying a current to the load section via a plurality of lines and interrupts the supply of the current from the external AC power supply to the load section; a current detection circuit that outputs a detection signal corresponding to a difference in level between currents flowing through the lines; a suppression circuit that suppresses a DC component contained in the detection signal; a filter circuit that filters a plurality of frequency components contained in the detection signal so that attenuation increases as a frequency becomes high; a rectifier smoothing circuit that rectifies and smoothens an output signal obtained when the detection signal passes through the filter circuit and the suppression circuit; and an electric leakage determination circuit that detects an electric leakage and shuts off the switch when the level of the signal smoothened by the rectifier smoothing circuit exceeds a preset reference level.

According to this configuration, the charging monitor is interposed between the load section having a storage battery and the external AC power supply when charging is performed. When the electric leakage determination circuit determines at the time of charging that an electric leakage has occurred, the switch disconnects the load section from the external AC power supply, whereby a charging operation is stopped. The current detection circuit outputs a detection signal of a voltage corresponding to the difference in level between the currents flowing through the lines of the external AC power supply. This detection signal is output as a signal having the same phase as an AC current flowing through each line. The suppression circuit suppresses the DC component contained in the detection signal. Furthermore, the filter circuit filters the plurality of frequency components contained in the detection signal so that attenuation increases as a frequency becomes high. In other words, the filter circuit performs filtering so that the plurality of frequency components correspond roughly to a perception current. The rectifier smoothing circuit rectifies and smoothens an output passing through the filter circuit and the suppression circuit, and outputs the rectified and smoothened output to the electric leakage determination circuit. The electric leakage determination circuit generates and outputs a shut off signal for shut off the switch when the level of the output of the rectifier smoothing circuit exceeds a predetermined reference level. Specifically, if there is no electric leakage, even if a difference is increased from zero by the excess current that flows temporarily to the AC lines after the start of charging in order to absorb a potential difference between the external AC power supply and the load side circuit, the DC component in a signal for this difference is suppressed. Consequently, the DC level of the detection signal for the difference is suppressed, and

BEST MODE FOR CARRYING OUT THE INVENTION

Figure 1:
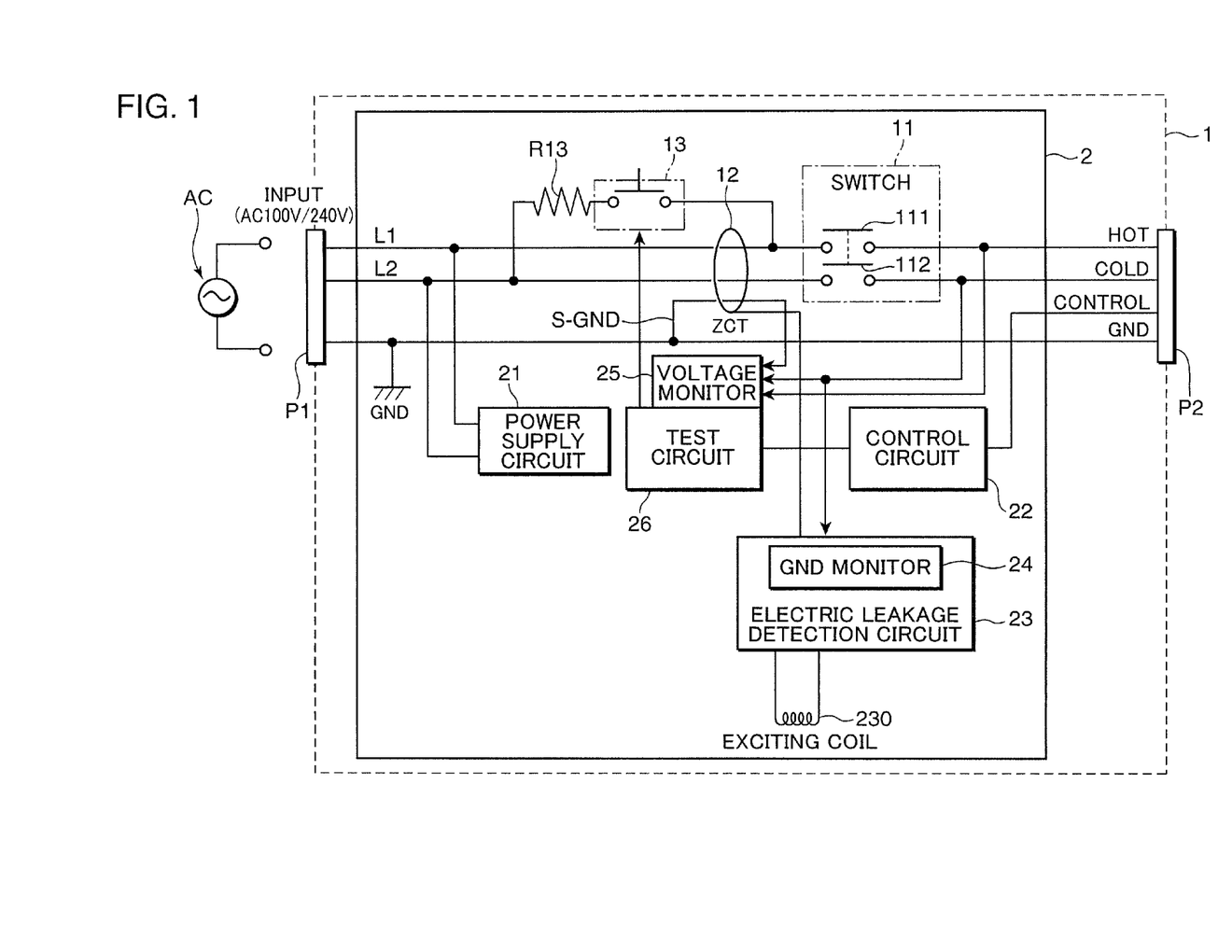
FIG. 1 is a block diagram showing an embodiment of the case where a charging monitor of the present invention is applied to a charging device having a storage battery.

FIG. 1 is a block diagram showing an embodiment of the case where a charging monitor of the present invention is applied to a charging device having a storage battery (battery). In FIG. 1, a charging monitor 1 has a plug P1 connected to an external AC power supply AC, a plug (socket) P2 connected to the battery of the charging device (load section), and a circuit block 2 for monitoring the charging of the battery, between the plug P1 and the plug P2. AC lines L1, L2 (Hot, Cold), a ground line (GND), and a control signal line between the charging monitor 1 and the load section are provided between the plugs P1, P2.

A circuit block 2 for monitoring the charging of the battery has a switch 11 serving as an electromagnetic relay (breaker) interposed between the AC lines L1, L2, a residual current transformer (ZCT) 12 serving as a current detection circuit provided between the AC lines L1, L2 on the external AC power supply AC side, and an electromagnetic relay 13 used for testing. Note that a semiconductor switching element such as a photo MOS relay, or other various switching elements can be used in place of the electromagnetic relay 13.

The switch 11 has relay contacts 111, 112 interposed in the AC lines L1, L2 respectively. The electromagnetic relay 13 is connected between the AC lines L1, L2 and astride the ZCT 12. In other words, on one side of the ZCT 12, one of the AC lines L1, L2 is connected to the other AC lines L1, L2 on the other side of the ZCT 12 via a series circuit of a resistor R13 and the electromagnetic relay 13 through the outside of the ZCT 12.

The circuit block 2 has a power supply circuit 21, a control circuit 22, an electric leakage detection circuit 23, a ground monitor 24, a voltage monitor 25 (contact state detector), and a test circuit 26 (part of contact state detecting means, a welding determination part). The power supply circuit 21 is connected to the AC lines L1, L2 on the input side of the plug P1 and to the external AC power supply AC, and thereby generates a power-supply voltage of a certain level required by each circuit part.

The control circuit 22 performs, with a charge control circuit 51 (see FIG. 2), communication for checking the connection with a battery 53 (see FIG. 2), instructing test operation, and permitting the start of charging. The electric leakage detection circuit 23 detects an electric leakage based on an output signal of the ZCT 12.

The voltage monitor 25 is connected to the AC lines L1, L2 on the input side of the plug P2 and detects the voltage between the AC lines L1, L2. Furthermore, sub-ground lines S-GND that are divided from the ground line GND are input to the voltage monitor 25 via the ZCT 12 (as a primary side). The test circuit 26 executes the test operation of the switch 11 and notifies the control circuit 22 of the test result.

An exciting coil 230 provided on the output side of the electric leakage detection circuit 23 is an exciting coil of the switch 11. When an electric leakage is detected by the electric leakage detection circuit 23, the supply of current is stopped, and the closed state of the relay contacts 111, 112 of the switch 11 is changed to the opened state at once. Furthermore, at the time of the start of charging, a current flows to the exciting coil 230, and the opened state of the relay contacts 111, 112 is switched to the closed state at the same time.

The control circuit 22 is activated once it receives the supply of electricity from the power supply circuit 21, and performs, for example, the communication for checking the connection with the charge control circuit 51 of the load section 50 and instructs the test circuit 26 on the test operation once the connection is checked. When it is determined based on the test operation that the load section 50 is normal, the control circuit 22 allows charging to be started.

The test circuit 26 switches the state of the electromagnetic relay 13 to the closed state and establishes a short circuit between the AC lines L1, L2 by means of the resistor R13 for a predetermined amount of time. Based on this short circuit, the occurrence of an abnormality that (electric leakage) is detected in the electric leakage detection circuit 23 as described hereinafter, the state of the switch 11 is switched to the opened state. When the voltage monitor 25 detects based on this switching that the voltage between the AC lines L1, L2 is eliminated, the test circuit 26 outputs this detection result to the control circuit 22 based on the fact that the electric leakage detection circuit 23 and the switch 11 are operated normally.

Figure 5:
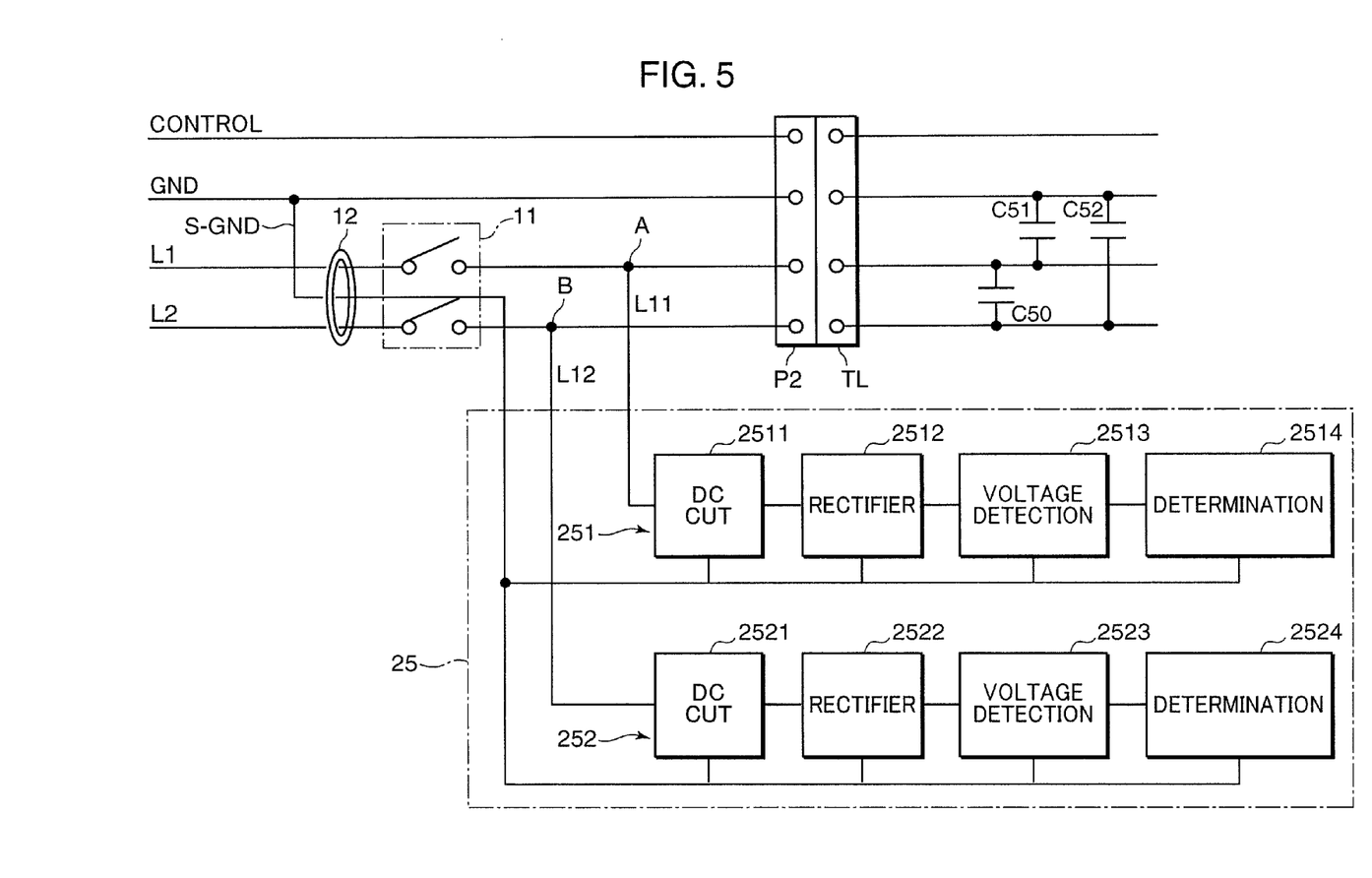
FIG. 5 is a block diagram showing in detail an example of a voltage monitor shown FIG. 1.

When the voltage monitor 25 detects an abnormality that there is no a voltage change, the test circuit 26 outputs to the control circuit 22 a signal indicating the presence of the abnormality at the time of the test. Note that the checking performed by the voltage monitor 25 includes checking the presence/absence of welding of the relay contacts 111, 112 of the switch 11. FIG. 5 shows the voltage monitor 25 in detail.

Figure 2:
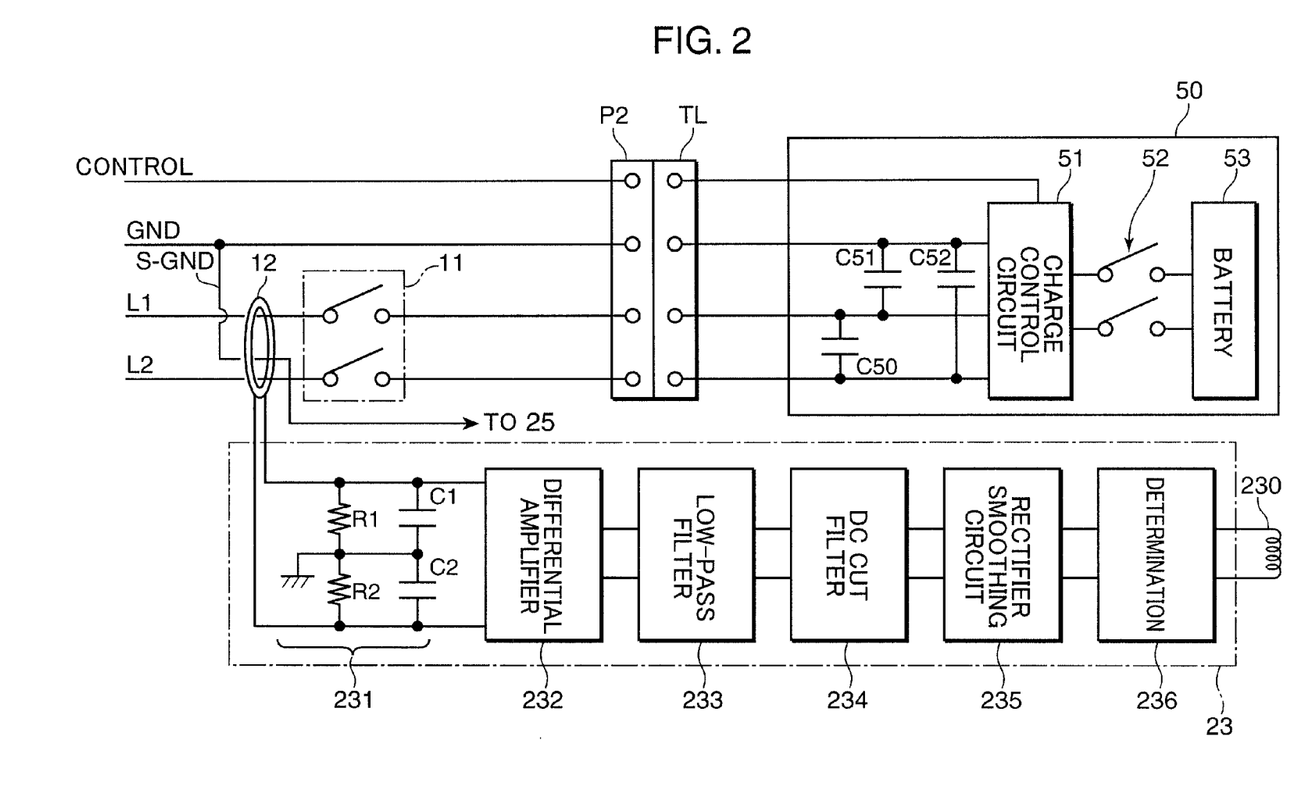
FIG. 2 is a block diagram showing in detail an example of an electric leakage detection circuit shown in FIG. 1.

When a signal indicating that the load section 50 is normal is received from the test circuit 26, the control circuit 22 instructs the load section 50 to start charging. When a signal indicating that the load section 50 is abnormal, the control circuit 22 disallows the charging of the load section 50. The electric leakage detection circuit 23 detects the presence/absence of an abnormality during the charging operation, and the detail of the electric leakage detection circuit 23 is shown in FIG. 2.

FIG. 5 is a block diagram showing in detail an example of the voltage monitor 25 shown in FIG. 1. In FIG. 5, the ZCT 12 is configured by a secondary winding (coil) that is wound around a circular core of, for example, permalloy or other electromagnetic material a number of times, wherein the AC lines L1, L2 and the sub-ground line S-GND, the primary side, are inserted into the circular core. The sub-ground line S-GND is divided between the plug P1 and the ZCT 12 in the middle of the ground line GND, and is used as a common line (ground) of the voltage monitor 25, as described hereinafter.

The voltage monitor 25 is configured by first and second voltage monitor circuits 251, 252, which basically have the same circuit configuration. The first voltage monitor circuit 251 is configured by connecting, in the following order, a DC cut circuit 2511 (DC component interrupting circuit) for interrupting the DC component from an input signal and configured by, for example, a capacitor, a rectifier circuit 2512 for rectifying an input AC signal to a DC signal, a voltage detection circuit 2513 for detecting the level of a rectified voltage signal, and a determination circuit 2514 for detecting or determining whether or not the detected voltage level exceeds a predetermined set value. Similarly, the second voltage monitor circuit 252 is configured by connecting, in the following order, a DC cut circuit 2521 (DC component interrupting circuit), a rectifier circuit 2522, a voltage detection circuit 2523, and a determination circuit 2524.

In the first voltage monitor circuit 251, the DC cut circuit 2511 is connected to the AC line L1 at a position A via the ZCT 12 and the switch 11, as viewed from the plug P1. The common side of the DC cut circuit 2511, the rectifier circuit 2512, the voltage detection circuit 2513, and the determination circuit 2514 are connected to the sub-ground line S-GND. In the second voltage monitor circuit 252, the DC cut circuit 2521 is connected to the AC line L2 at a position B via the ZCT 12 and the switch 11, as viewed from the plug P1. The common side of the DC cut circuit 2521, the rectifier circuit 2522, the voltage detection circuit 2523, and the determination circuit 2524 are connected to the sub-ground line S-GND.

Figure 6:
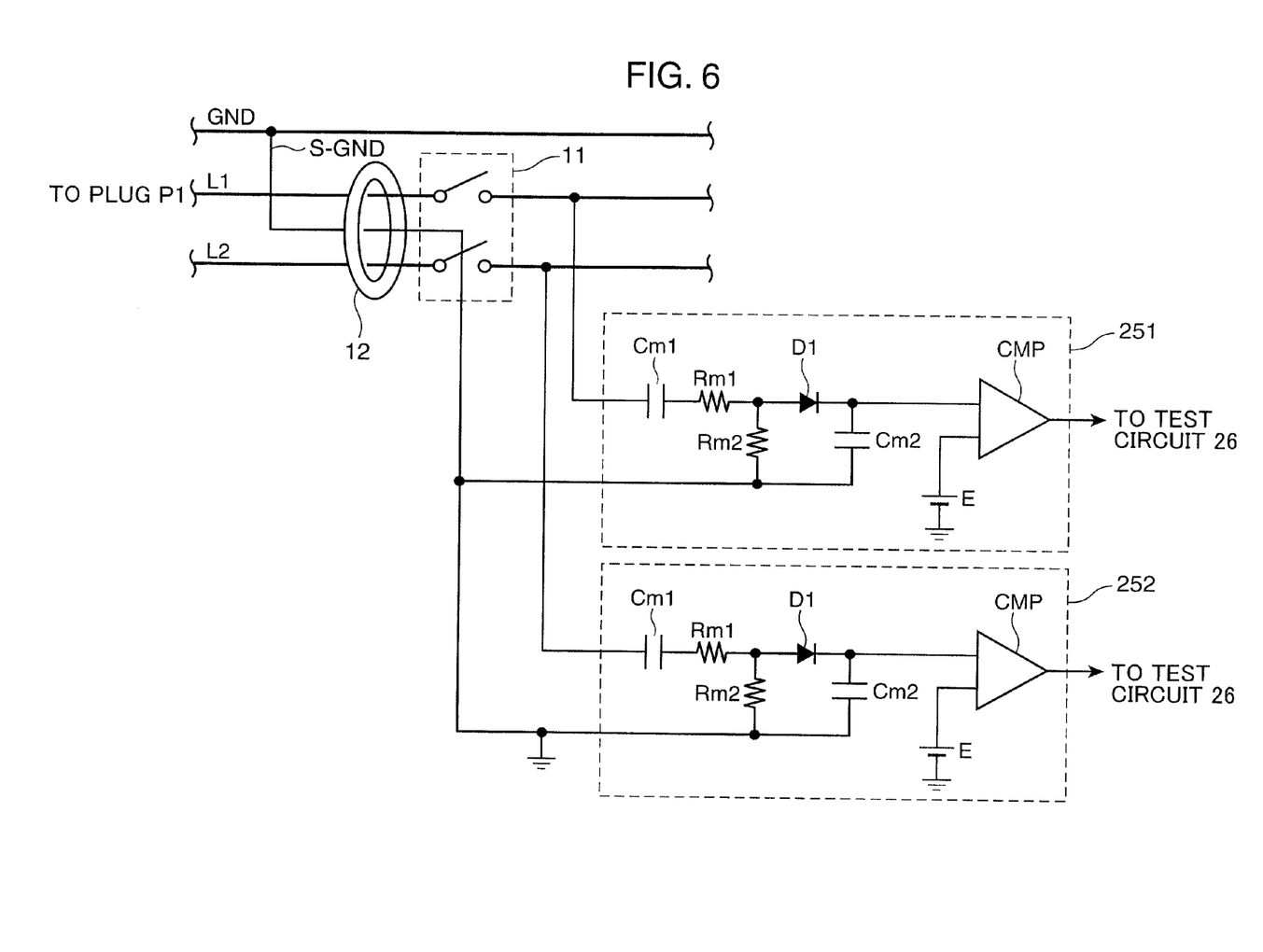
FIG. 6 is a circuit diagram showing an example of a configuration of a voltage monitor circuit shown in FIG. 5.

FIG. 6 is a circuit diagram showing an example of a configuration of the first voltage monitor circuit 251 and the second voltage monitor circuit 252. In the first voltage monitor circuit 251 shown in FIG. 6, the position A of the AC line L1 is connected to one of the input terminals of a comparator CMP (voltage detection circuit) via a capacitor Cm1 (third capacitor), a resistor Rm1 (third resistor), and a diode D1. The connection point between the resistor Rm1 and the diode D1 is connected to the sub-ground line S-GND via the resistor Rm2 (fourth resistor). The connection point between the diode D1 and the comparator CMP is connected to the sub-ground line S-GND via a capacitor Cm2 (fourth capacitor).

A reference voltage source E generating a preset reference voltage is connected to the other input terminal of the comparator CMP. In this case, the capacitor Cm1 is the same as an example of the DC cut circuit 2511, the diode D1 as an example of the rectifier circuit 2512, and the comparator CMP examples of the voltage detection circuit 2513 and the determination circuit 2514.

The voltage monitor circuit 252 has the same configuration as the voltage monitor circuit 251 except that, instead of the position A, the position B of the AC line L2 is connected to the capacitor Cm1, thus the description of the configuration of the voltage monitor circuit 252 is omitted.

Next, a welding state detection operation of the switch 11 performed by the voltage monitor 25 is described. First, the test circuit 26 outputs an instruction signal for changing the state of the switch 11 to the opened state. Specifically, the supply of an excitation current to the exciting coil 230 is stopped. When each of the relay contacts 111, 112 is operated normally (not welded), both of them becomes the opened state, or otherwise at least one of the abnormal (welded) relay contacts 111, 112 remains closed.

Next, the test circuit 26 outputs to the first and second voltage monitor circuit 251, 252 an instruction to carry out a detection operation. In response to this instruction, the first and second voltage monitor circuits 251, 252 start the detection operation and outputs a determination result to the test circuit 26 in accordance with the detected voltage level.

When both the relay contacts 111, 112 of the switch 11 are normal, divided lines L11, L21 are broken and as a result the voltage monitor 25 is not supplied with voltage, thus voltage is not applied to the DC cut circuits 2511, 2521. However, a DC current corresponding to an accumulated charge might flow from any of potential difference absorption capacitors C50, C51 and C52 within the load section 50 (see FIG. 2) having a plug TL, to the voltage monitor circuits 251, 252, the potential difference absorption capacitors being described hereinafter.

However, because the voltage monitor circuits 251, 252 are provided with the DC cut circuits 2511, 2521, the DC current supplied from any of the capacitors C50, C51 and C52 is interrupted and does not flow to the rectifier circuits 2512, 2512. Hence, false detection of a voltage from the DC current supplied from any of the capacitors C50, C51 and C52 is prevented in the voltage detection circuits 2513, 2523. By preventing a false detection of a voltage in the voltage detection circuits 2513, 2523 as described above, the risk of false detection of an abnormality in the switch 11 due to the DC current supplied from the capacitors C50, C51 and C52 is reduced in the determination circuits 2514, 2524. Therefore, even in this case, welding state detection of the switch 11 is performed normally.

Incidentally, when welding detection is performed on an electromagnetic relay interposed between an external AC power supply and a battery as illustrated in Patent Document 1 (Japanese Patent Application Publication No. H11-205909), if charge is accumulated in a capacitor provided in a load section, a so-called power supply part exists on both sides of the electromagnetic relay, and the level of a current to be detected is affected by the battery, as in the abovementioned capacitors C50, C51 and C52, thus accurate welding detection cannot be carried out. In addition, when the ground line of the external AC power supply floats from the grounding, and capacity coupling occurs between both sides, this capacity coupling affects the current to be detected for some reason, thus accurate welding detection cannot be carried out.

However, according to the charging monitor 1 shown in FIG. 1, because the voltage monitor 25 has the DC cut circuits 2511, 2521 (DC component interrupting circuit), it is possible to provide a charging monitor that eliminates the impact of a sneak current from other section and accurately detects the presence/absence of the alternating current from the external AC power supply, so that welding detection of the relay contacts of the switch can be performed accurately.

Next, when one of the relay contacts 111, 112 of the switch 11, e.g., the relay contact 111, is welded, a voltage is applied to the DC cut circuit 2511 only by an AC input through the AC line L1. The generated voltage is rectified by the rectifier circuit 2512, and the level of the voltage is detected by the voltage detection circuit 2513. When the level of the voltage exceeds a predetermined set level, the determination circuit 2514 determines that there is an abnormality. Therefore, welding of the relay contact 111 is detected.

Similarly, when both the relay contacts 111, 112 are welded, both the determination circuits 2514, 2524 determine that there is an abnormality. Therefore, in either case, the welding state detection of each of the relay contacts of the switch 11 is carried out normally.

Note that each of the voltage monitor circuits 251, 252 is configured to interrupt the DC component that is input to the DC cut circuits 2511, 2521 and to allow only the passage of all AC components to return the AC components to the sub-ground line S-GND. Therefore, as described hereinafter, compared to a configuration where the AC components are returned to the ground line GND, the number of interlinkage magnetic fluxes on the primary line of the ZCT 12 can be balanced. As a result, regardless of the presence of the voltage monitor circuits 251, 252, the normal operation of the electric leakage detection circuit 23 can be ensured. Note that the voltage detection circuits 2513, 2523 may be processed digitally. Thus, the determination circuits 2514, 2524 may be configured by performing a determination process with software using a microcomputer.

FIG. 2 is a block diagram showing an example of the electric leakage detection circuit 23 in detail. In FIG. 2, first of all, the load section 50 has the plug TL connected to the plug P2, and the AC lines L1, L2, the ground line GND, and the control signal line can be connected to the load section 50 via this plug TL. The load section 50 has a well-known inverter-type charge control circuit 51, a relay 52, and the chargeable/dischargeable battery (storage battery) 53. Note that the illustration of the output side of the battery 53 is omitted. In addition, various systems can be adopted as the charge control circuit 51. For example, the voltage of each of the AC lines L1, L2 may be charged once, switched at a high frequency, converted into a predetermined DC voltage, and used for charging the battery 53 via the relay 52 by means of, for example, a current of more than ten amperes. The relay 52 is for stopping the charging operation when the battery 53 is fully charged.

The capacitor C50 is connected between the AC lines L1, L2, the capacitor C51 between the AC line L1 and the GND, and the capacitor C52 between the AC line L2 and the GND. When the plug P2 and the plug TL are connected and the charging operation is started, these capacitors C50, C51 and C52 may generate a potential difference between the AC lines L1, L2 due to the superimposition of an excess current, generated temporarily to absorb the voltage level difference between a conversion voltage level within the charge control circuit 51 and the voltage level of the AC lines L1, L2. By performing a switching operation in the charge control circuit 51 at a high frequency, the current of a high-frequency noise flows through the AC lines L1, L2, generating a potential difference in similar manner, whereby a noise current at each level flows to at least one of the capacitors.

The abovementioned current flowing to the capacitors C50, C51, C52 generates a difference in current level between the AC lines L1, L2 of the charging monitor 1. A difference in current level between the AC lines L1, L2 is similarly generated by an electric leakage that is caused by a decrease in insulation around the power system line, each connection plug and the battery 53, or by a short circuit between the ground and a section having a different voltage.

The ZCT 12 detects such difference in current level. The ZCT 12 is configured by a secondary winding (coil) that is wound around a circular core of, for example, permalloy or other electromagnetic material a number of times, wherein the AC lines L1, L2 and the ground line are inserted into the circular core. With this configuration, in both ends of the coil, a voltage corresponding to the difference between the numbers of interlinkage magnetic fluxes that is generated by currents normally having a frequency of 60 Hz and flowing in direction opposite to each other in the AC lines L1, L2 and the ground line (however, no need to take into account this in an embodiment adopting a single phase voltage of 200V, because the ground line is connected to the ground) is induced. Therefore, while a normal alternating current flows to the AC lines L1, L2, the numbers of interlinkage magnetic fluxes in opposite directions become equal to each other, where by the difference becomes zero. As a result, while there is no output from the ZCT 12, an electric leakage current flows to either one of the AC lines, or the current level between the AC lines L1, L2 changes when a current from another part is superimposed. Consequently, a difference voltage is generated at each end of the coil of the ZCT 12.

As described in FIG. 5, the AC component of the alternating current flowing from the AC lines L1, L2 to the voltage monitor 25 is returned securely to the ZCT 12 via the sub-ground line S-GND by providing the DC cut circuits 2511, 2521 to the input stages of the voltage monitor circuits 251, 252. Therefore, even when a difference is generated in the current flowing to the AC lines L1, L2 by the current flowing to the voltage monitor 25 while the battery is charged, the difference in flux that occurs in the AC lines L1, L2 is offset by the current returned to the sub-ground line S-GND, whereby false detection of an electric leakage is prevented by the effect of the voltage monitor 25.

The current is returned from the voltage monitor 25 to the sub-ground line S-GND specifically by the resistor Rm2 and the capacitor Cm2 shown in FIG. 6.

As described in the background art above, an electric leakage might occur at the time of charging, due to a poor connection between the charging line and the device or an insulation defect caused around the battery of the device. It is desired that such electric leakage is detected in an early stage for the reason of an electric shock, breakdown of the device, and detraction of the charging efficiency. Furthermore, in a structure where the device is insulated from the ground, an electric charge caused by electric leakage at the time of charging flows to the ground through a human body, causing a discomfort feeling.

Therefore, as described in Patent Document 1 (Japanese Patent Application Publication No. H11-205909), charging is performed in a state where the charging device having a relay is interposed between the external AC power supply and the battery. This relay is an electromagnetic relay that has a relay contact on two AC lines extending from the external AC power supply. As described in Patent Document 1, when an electric leakage is confirmed by the electric leakage detection circuit, the state of the both relay contacts of the electromagnetic relay is switched to an opened stated simultaneously to open the external AC power supply from the battery side.

Incidentally, because the battery of this type of device is charged by a relatively large current of more than ten amperes, in the electromagnetic relay the relay contacts is repeatedly molten slightly by a transient inrush current caused by repeatedly switching the electromagnetic relay on and off, and in some cases the relay contacts might be welded to a fixed end. For this reason, there has conventionally been known a device that has, within a charging monitor, a circuit for detecting welding of an electromagnetic relay. This welding detection circuit detects the presence/absence of a voltage between two AC lines while being connected to an external AC power supply and providing an instruction signal for bringing the electromagnetic relay to an opened state. When the voltage is detected, the presence of the welding is detected.

Moreover, in a technology for detecting welding between a relay contact and a fixed point, Japanese Patent Application Publication No. 2006-310219 describes a welding detection device that is interposed in the middle of two current supply lines connecting a battery to an inverter in an electric vehicle. This welding detection device is configured to be able to detect the presence/absence of welding of each of main relays R1, R2 interposed in two current supply lines, wherein detection of the presence/absence of welding of each main relay allows detection of an abnormality of the relay in an as early stage as possible before the both relay contacts are welded.

However, in the welding detection device described in Japanese Patent Application Publication No. 2006-310219, the main relays R1, R2 are sort of individual relays that can be on-off driven independently, thus the detection operation is executed sequentially while applying a drive signal to the relays successively, and the main relays R1, R2 are different than one electromagnetic relay in which the relay contacts are turned on/off in synchronization. As a circuit configuration for individually detecting the presence/absence of welding of each relay contact of an electromagnetic relay, there is considered a pair of circuits that detects the presence/absence of a voltage between each AC line and a ground line when an instruction is sent to bring the electromagnetic relay to the opened state.

On the other hand, unlike Patent Document 1, the one conventionally and generally adopted as a device capable of detecting a small electric leakage is an electric leakage monitor that is provided with a residual current transformer having inserted therein two AC lines, as the primary side, from an external AC power supply, wherein a small electric leakage current can be detected by detecting a difference in level of currents flowing to the both AC lines. In this configuration for detecting a difference in level of currents flowing to the both AC lines as described above, when a pair of circuits for detecting the presence/absence of a voltage between each AC line and the ground line is adopted as the welding detection circuit, the currents flowing through the both AC lines become unbalanced by a current that flows between one of the AC line and the ground line via the welding detection circuit, whereby the current difference is detected by the residual current transformer, causing a false operation of the electric leakage detection circuit.

In the charging monitor 1 shown in FIG. 1, however, the alternating current that flows from the AC lines L1, L2 to the voltage monitor 25 is returned to the ZCT 12 via the sub-ground line S-GND. Hence, it is possible to provide an electric leakage monitor, which is provided with a circuit configuration for individually detecting the presence/absence of welding of the relay contacts of the AC lines by detecting the voltage between each AC line and the ground line, but is capable of avoiding false detection of a small level of electric leakage by preventing the impact on the accuracy of electric leakage detection using a residual current transformer.

In a neutral ground circuit 231 functioning as a voltage suppression circuit, a series circuit configured by the two resistors R1, R2 having the same resistance value and a series circuit configured by the two capacitors C1, C2 having the same capacity value are parallely connected at both ends of the coil of the ZCT 12, and the midpoint between each of the resistors R1, R2 and the midpoint between each of the capacitors C1, C2 are connected to the ground. The detected voltage of the coil is input to a differential amplifier circuit 232 via the neutral ground circuit 231. In a configuration where both terminals of the coil of the ZCT 12 are input directly to the differential amplifier, in the differential amplifier a difference voltage is temporarily generated as a DC signal from the coil when an excess current is superimposed in one of the AC lines L1, L2 as charging started. However, by providing the neutral ground circuit 231, the temporal flow of a current having a DC component does not make the output bias toward one of the polarities because the midpoint of the output matches a ground reference. Accordingly, the level of the DC component is suppressed. Therefore, it is possible to prevent false detection that determines that there is an electric leakage due to superimposition of an excess current in the AC lines L1, L2, the excess current being generated temporarily as charging is started.

The differential amplifier circuit 232 is configured by two operational amplifiers, wherein a terminal of the coil of the ZCT 12 is connected to one of input terminals of each operational amplifier, while the ground is connected to the other input terminal. A difference between the former input terminal and the latter input terminal is amplified and output, and a difference between the outputs of the both operational amplifiers is obtained. In an aspect where one operational amplifier is used to amplify and output the difference, offset voltage of the amplifier has an impact on the difference voltage, and therefore a false difference corresponding thereto might occur. However, by arranging two operational amplifiers in parallel, both offset voltages are offset, and the difference in input voltage with a zero potential is amplified, whereby high accuracy can be secured.

A low-pass filter 233 (filter circuit) is a filter having a frequency characteristic of an electric leakage current. As in the case where, for example, a noise frequency and a commercial power supply frequency is superimposed on the electric leakage current, an example of the circuit is shown in FIG. 3 based on a filter adopted when the electric leakage current contains a plurality of frequencies (multiple frequency).

Figure 3:
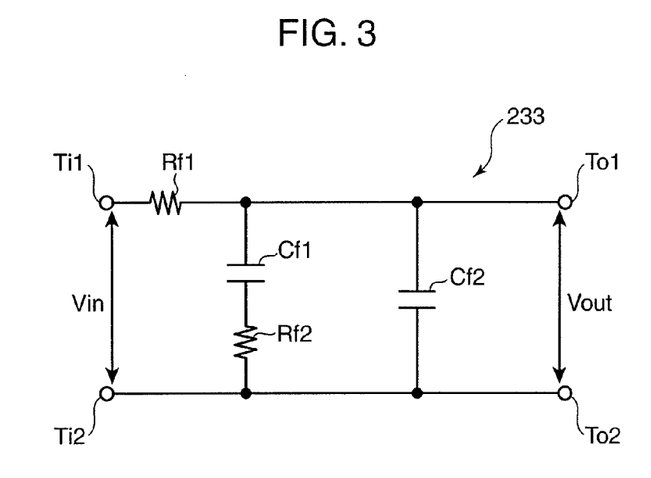
FIG. 3 is a circuit diagram showing an example of a low-pass filter shown in FIG. 2.

The low-pass filter shown in FIG. 3 simulates a relationship between a frequency of a current and a current value that is perceived by a human (Let-go curve). In FIG. 3, the low-pass filter 233 has a first input terminal Ti1, a second input terminal Ti2, a first output terminal To1, and a second output terminal To2.

The first input terminal Ti1 is connected to the first output terminal To1 via a resistor Rf1 (first resistor). A series circuit composed of a capacitor Cf1 (first capacitor) and a resistor Rf2 (second resistor) is connected between the second output terminal To2 connected to the first input terminal Ti1 and the first output terminal To1. A capacitor Cf2 (second capacitor) is connected in parallel with this series circuit.

Therefore, a signal that is output by the differential amplifier circuit 232 to between the first input terminal Ti1 and the second input terminal Ti2 is filtered by the low-pass filter 233, then output between the first output terminal To1 and the second output terminal To2, and output to a DC cut filter 234.

Furthermore, the resistance value of the resistor Rf1 is, for example, 10 KΩ, and the resistance value of the resistor Rf2 is, for example, 20 KΩ. The capacitance of the capacitor Cf1 is, for example, 0.0062 μF, and the capacitance of the capacitor Cf2 is, for example, 0.0091 μF.

In the actual device, it is desired to obtain a frequency characteristic corresponding to the Let-go curve for the entire electric leakage detection circuit 23, and it is desired that the low-pass filter 233 is provided with the frequency characteristic to obtain the frequency characteristic corresponding to the Let-go curve for the entire electric leakage circuit 23. As the low-pass filter 233 in which the frequency characteristic is set, the low-pass filter 233 shown in FIG. 3 which does not have the capacitor Cf2 and in which the resistance value of the resistor Rf1 is set at 10 KΩ, the resistance value of the resistor Rf2 at 5.1 KΩ, and the capacitance of the capacitor Cf1 is set at 390 pF can be used.

Figure 4:
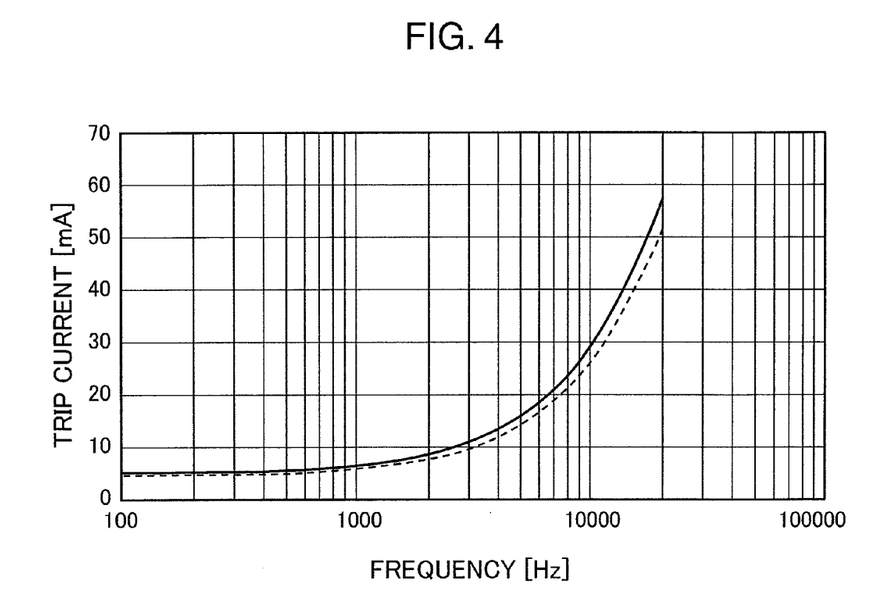
FIG. 4 is a diagram showing an example of a frequency characteristic of the low-pass filter in which the level of a current containing multiple frequency is associated with a perception threshold (trip current).

FIG. 4 illustrates an example of the frequency characteristic of the low-pass filter 233 in which the level of the current containing multiple frequency is associated with a perception threshold (trip current) ("Threshold of Perception Current" by Dalziel. C. F, Proceedings of AIEE, Part III-B, P. 990 to 996, issued in 1954).

In FIG. 4, the graph shown by a solid line represents a limiting value of a current that is perceived by a human and interrupts an electric leakage (trip current). The graph shown by a dashed line represents an electric leakage determination level that is obtained by appropriately setting a reference level in a determination circuit 236 described hereinafter in use of the abovementioned low-pass filter 233.

As shown in FIG. 4, while the trip current is approximately 5 mA when the frequency is 50 Hz or 60 Hz, the level of the trip current rises as the frequency increases, and the frequency and a signal attenuation characteristic are adjusted to a perception threshold. Therefore, in the low-pass filter 233, the frequency characteristic is set such that the attenuation increases as the frequency becomes high when a current flows through the human, whereby the frequency characteristic is set so as to correspond to the relationship (Let-go curve) between the frequency of the current and the current value perceived by the human.

Thus, when a filter for assuming, for example, a commercial AC frequency and passing 60 Hz is used in the electric leakage circuit, and when a noise current of 1 KHz and 5 mA is superimposed on a current of, for example, 60 Hz and 3 mA, the total of 8 mA is obtained. As a result, although the electric leakage needs to be interrupted (tripped), the noise current of 1 KHz is interrupted in the filter circuit, whereby the electric leakage cannot be detected or interrupted.

However, in the charging monitor 1, the frequency characteristic of the low-pass filter 233 is set so as to correspond to the relationship between the frequency of the current and the current value perceived by the human (Let-go curve). Thus, even in a high-frequency region where the limiting value of the current is high, the passage of the frequency is allowed while increasing the attenuation in accordance with the Let-go curve, so that an electric leakage can be detected appropriately for a leakage current in which a plurality of frequencies are superimposed.

The DC cut filter 234 interrupts the DC component from the differential voltage that is superimposed on the AC lines L1, L2 and detected based on the transient current that is generated temporarily as charging is started. The DC cut filter 234 is typically configured by a DC cut capacitor. Because the DC component is interrupted by this DC cut filter 234, it is possible to prevent false detection that confirms the presence of an electric leakage, which is caused by a detection signal due to superimposition of the transient current generated temporarily as charging is started. Note that although the neutral ground circuit 231 and the DC cut filter 234 both configure a suppression circuit, they may not only be provided with these circuits but also adopt one of the circuits.

A rectifier smoothing circuit 235 rectifies, smoothens, and outputs an output signal of the DC cut filter 234. The rectifying operation of the rectifier smoothing circuit 235 can be obtained as a full-wave rectifier type circuit configuration because the DC component is cut by the DC cut filter 234. In addition, by performing full-wave rectification, the sensitivity and responsiveness of electric leakage detection can be improved after suppressing the DC component. The determination circuit 236 (electric leakage determination circuit) is configured as a comparison circuit for comparing the level of an input signal with a preset reference level, wherein when the input signal level exceeds the reference level, it is determined that an electric leakage is generated, the supply of current to the exciting coil 230 is stopped, and the closed state of the switch 11 obtained during charging is switched to the opened state obtained at the time of the occurrence of an abnormality.

Note that the determination circuit 236 may convert the input signal to a digital signal and perform a comparison determination process with software using a microcomputer. Moreover, the determination circuit 236 may not be provided with the sub-ground line S-GND.

In the present embodiment, by adopting the sub-ground line S-GND in the voltage monitor 25, a highly accurate detection operation of the electric leakage detection circuit 23 is secured regardless of the presence of the voltage monitor 25. However, after the test operation performed prior to charging (during a test charging operation), for example, a switch for electrically or mechanically separating the voltage monitor 25 from the AC lines L1, L2 is provided so that the impact of the voltage monitor 25 can be eliminated. Alternatively, various other methods can be provided so that the impact of the presence of the voltage monitor 25 on the electric leakage detection accuracy can be suppressed. In this case, various other embodiments can be adopted as the voltage monitor 25, and thus the sub-ground line S-GND becomes unnecessary.

Figure 7:
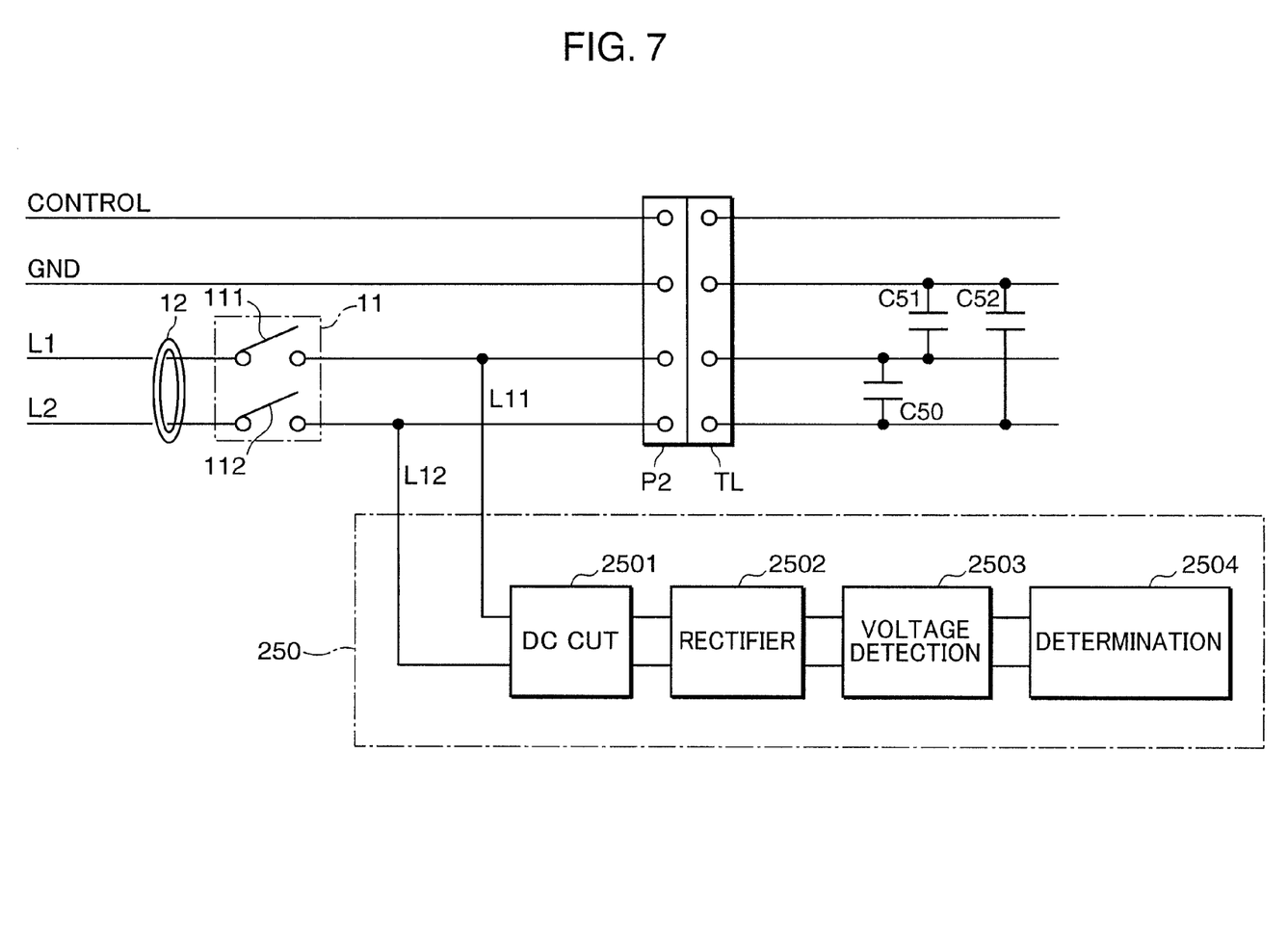
FIG. 7 is a block diagram of another embodiment of a voltage monitor shown in FIG. 1.

FIG. 7 is a block diagram of another embodiment of the voltage monitor shown in FIG. 1. A voltage monitor circuit 250 shown in FIG. 7 has the same circuit configuration as the voltage monitor circuit 251 (252) shown in FIG. 5, and therefore is provided with a DC cut circuit 2501, a rectifier circuit 2502, a voltage detection circuit 2503 and a determination circuit 2504 in this order. Note that the DC cut circuit 2501 of the input stage of the voltage monitor circuit 250 is connected to the divided lines L11, L21 obtained from the AC lines L1, L2.

In the embodiment shown in FIG. 7, welding detection is not performed for the individual relay contacts 111, 112 of the switch 11, but the occurrence of welding in at least one of the relay contacts 111, 112 can be detected. According to such circuit configuration as well, the DC component of sneak current resulted from the accumulated charges of the capacitors C50, C51 and C52 of the load section 50 can be interrupted, and false detection of the welding state can be prevented, whereby the detection can be executed accurately.

In addition, according to the present invention, in place of the aspect where the common side of each voltage monitor circuit 251, 252 is connected to the sub-ground line S-GND, an aspect where the common side is connected to the ground line GND may be adopted as the embodiment of the voltage monitor 25 shown in FIG. 5. In this case as well, the impact on the electric leakage detection circuit 23 can be suppressed while securing accurate welding detection, by performing the same procedure as the one shown in FIG. 7.

Moreover, although the present embodiment has described an example that adopts a single-phase alternating current of 200V and 60 Hz, the present invention can be applied to various external AC power supplies (voltages, frequencies). The present invention can also be applied to a charging system for charging the battery of an electric vehicle or an automobile having two drive sources such as the engine and electric motor, a storage system for a household battery or a battery of electrically-powered equipment, and a storage system for photovoltaic generation or wind-power generation.

Specifically, the charging monitor according to one aspect of the present invention has: a switch that is disposed between a load section having a storage battery and an external AC power supply supplying a current to the load section via a plurality of lines and interrupts the supply of the current from the external AC power supply to the load section; a current detection circuit that outputs a detection signal corresponding to a difference in level between currents flowing through the lines; a suppression circuit that suppresses a DC component contained in the detection signal; a filter circuit that filters a plurality of frequency components contained in the detection signal so that attenuation increases as a frequency becomes high; a rectifier smoothing circuit that rectifies and smoothens an output signal obtained when the detection signal passes through the filter circuit and the suppression circuit; and an electric leakage determination circuit that detects an electric leakage and shuts off the switch when the level of the signal smoothened by the rectifier smoothing circuit exceeds a preset reference level.

According to this configuration, the charging monitor is interposed between the load section having a storage battery and the external AC power supply when charging is performed. When the electric leakage determination circuit determines at the time of charging that an electric leakage has occurred, the switch breaks between the load section and the external AC power supply, whereby a charging operation is stopped. The current detection circuit outputs a detection signal of a voltage corresponding to the difference in level between the currents flowing through the lines of the external AC power supply. This detection signal is output as a signal having the same phase as an AC current flowing through each line. The suppression circuit suppresses the DC component contained in the detection signal. Furthermore, the filter circuit filters the plurality of frequency components contained in the detection signal so that attenuation increases as a frequency becomes high. In other words, the filter circuit performs filtering so that the plurality of frequency components correspond roughly to a perception current. The rectifier smoothing circuit rectifies and smoothens an output passing through the filter circuit and the suppression circuit, and outputs the rectified and smoothened output to the electric leakage determination circuit. The electric leakage determination circuit generates and outputs a shut off signal for shut off the switch when the level of the output of the rectifier smoothing circuit exceeds a predetermined reference level. Specifically, if there is no electric leakage, even if a difference increases from zero by the transient current that flows temporarily to the AC lines after the start of charging to absorb a potential difference between the external AC power supply and the load side circuit, the DC component in a signal for this difference is suppressed. Consequently, the DC level of the detection signal for the difference is suppressed, and false detection is further prevented, so that the presence/absence of electric leakage can be detected accurately.

It is preferred that the filter circuit set a frequency characteristic thereof such that the frequency characteristic corresponds to a relationship between a frequency of a current flowing through a human and a current value perceived by the human.

According to this configuration, the detection signal is attenuated at the attenuation corresponding to the degree of perception of the human with respect to each frequency, and is then output to a subsequent circuit. Therefore, even when the plurality of frequency components are contained in an electric leakage current, the level of electric leakage detection can be set easily.

Preferably, in the filter circuit, a first input terminal is connected to a first output terminal via a first resistor, a series circuit composed of a first capacitor and a second resistor is connected between a second output terminal connected to the first input terminal and the first output terminal, the filtered signal is output between the first and second output terminals, and the current detection circuit outputs the detection signal between the first and second input terminals.

According to this configuration, the frequency characteristic of the filter circuit can be set easily such that the attenuation increases as the frequency becomes high, or such that the frequency characteristic corresponds to a relationship between the frequency of the current and the current value perceived by the human.

Further, it is preferred that the frequency characteristic of the filter circuit be set such that a frequency characteristic of an entire path that reaches the electric leakage determination circuit via the filter circuit, the suppression circuit and the rectifier smoothing circuit corresponds to the relationship between a frequency of a current flowing through the human and a current value perceived by the human.

According to this configuration, the electric leakage determination circuit can detect an electric leakage, such that the frequency characteristic corresponds to the relationship between the frequency of the current and the current value perceived by the human.

In addition, it is preferred that the suppression circuit be a DC component cut circuit that interrupts the DC component.

According to this configuration, the DC component that is contained in a difference caused by the temporarily generated transient current is interrupted.

It is also preferred that the current detection circuit be a zero-phase-sequence current transformer that has a detection coil wound around a circular core.

This configuration is suitable as a configuration of the current detection circuit.

It is further preferred that the suppression circuit be a circuit in which each of both terminals of the detection coil is connected to the ground via a resistor.

The difference is generated as a DC voltage between the terminals of the detection coil in case of a conventional system, but when adopting the circuit having the abovementioned configuration where each of the both terminals of the detection coil are connected to the ground via a resistor, the temporal flow of a current having a DC component does not make the output bias toward one of the polarities because the midpoint of the output matches a ground reference. As a result, the detected level is suppressed. Therefore, the DC component contained in the difference caused by the temporarily generated transient current is suppressed.

Furthermore, it is preferred that the charging monitor be further provided with a differential amplifier circuit that amplifies a difference voltage between each terminal of the detection coil and the ground.

According to this configuration, when the connection between the both terminals of the detection coil is guided to the differential amplifier circuit, the offset voltage of the amplifier circuit is included in amplification of the difference, and it is difficult to secure the accuracy of amplifying the difference alone. However, by adopting a configuration where the difference voltage between each terminal of the detection coil and the ground is amplified, offset voltages of the both amplifier circuits are offset, whereby the occurrence of an amplification error is prevented and the accuracy can be enhanced.

The plurality of lines include one ground line and two AC lines. The switch has a relay contact that opens/closes each of the two AC lines. In the circular core of the current detection circuit, a sub-ground line splitting from the ground line and the two AC lines are inserted in a section closer to the external AC power supply side than the switch. The charging monitor further has a contact state detector, which, when an instruction is sent to bring the switch into an opened state, detects a voltage between each of the AC lines closer to the storage battery side than the switch and the sub-ground line inserted into the core, wherein the contact state detector preferably returns a current flowing out of each AC line from the sub-ground line to the ground line via the core.

According to this configuration, the switch, which is interposed between the external AC power supply and the storage battery that is charged by the ground line and the two AC lines from the external AC power supply, has a relay contact that opens/closes each of the two AC lines. Therefore, in the switch, both or one of the relay contacts are welded. When an instruction is sent to bring the switch into the opened state, the contact state detector detects the occurrence of a voltage between each AC line closer to the storage battery than the switch and the sub-ground line splitting from the ground line. When the occurrence of a voltage is detected on at least one of the sides, it means that the relay contacts are welded on the other side. When the occurrence of a voltage is not detected in either one of the sides, it means essentially that each of the relay contacts is not welded. In addition, the difference in level between the currents flowing to the two AC lines closer to the external AC power supply than the switch and to the sub-ground line is detected as a voltage by the residual current transformer. When this difference voltage is detected, it means the there is an electric leakage, and if not, it means there is no electric leakage. In this case, part of an AC current flows in the loop of the sub-ground line from each AC line via the contact state detector. By configuring the sub-ground line as the primary side of the residual current transformer, the number of interlinkage magnetic fluxes of the both AC lines and of the sub-ground line are offset. As a result, due to the presence of the contact state detector, the electric leakage detection means is prevented from performing false detection, and a small level of electric leakage can be detected.

Moreover, it is preferred that the contact state detector have, at an input stage thereof, a DC component interrupting circuit for interrupting a DC component of each of the AC lines.

According to this configuration, even when a welding state is detected while the battery is connected, all of the DC currents flowing from the battery side are cut. Consequently, the impact on the battery is eliminated when detecting the welding state. Note in this configuration that a current flows backward from the AC lines to the sub-ground line, but because the sub-ground line is configured as the primary side of the residual current transformer, the impact thereof can be eliminated, as described above.

Preferably, the contact state detector includes two voltage monitor circuits, each of which detects a voltage between each AC line and the sub-ground line inserted into the core, wherein in each of the voltage monitor circuit, each AC line is connected to a voltage detection circuit via a third capacitor, a third resistor and a diode, a connection point between the third resistor and the diode is connected to the sub-ground line via a fourth resistor, and a connection point between the diode and the voltage detection circuit is connected to the sub-ground line via a fourth capacitor.

According to this configuration, the AC current component flowing from each AC line to the contact state detector can be returned from the sub-ground line to the ground line via the core by the fourth resistor and the fourth capacitor.

It is preferred that the plurality of lines include two AC lines, that the charging monitor further have a contact state detector that detects a voltage between the AC lines closer to the storage battery side than the switch when an instruction is sent to bring the switch into the opened state, and that the contact state detector have, at an input stage thereof, a DC component interrupting circuit for interrupting a DC component.

According to this configuration, the switch is interposed between the external AC power supply and the storage battery charged by the AC lines extending from the external AC power supply, and an opening/closing operation of the relay contacts opens/closes between the external AC power supply and the storage battery. The contact state detector detects a voltage between the AC lines closer to the storage battery side than the switch, in a state in which an instruction is sent to bring the switch into the opened state (time during which instruction is provided). Specifically, the presence/absence of welding of the relay contacts is detected depending on whether or not an AC current from the external AC power supply is detected via the switch. Furthermore, because the input stage of the contact state detector has the DC component interrupting circuit for interrupting the DC component, the component of a sneak DC current from the storage battery side or a sneak DC current obtained from capacitance coupling between the ground of the external AC power supply and the earth is interrupted. Consequently, the contact state detector can accurately detect only the presence/absence of an AC current from the external AC power supply.

It is preferred that the switch have the relay contacts for individually opening/closing the two AC lines, wherein the contact state detector has a circuit for detecting a voltage between each AC line and the ground line.

According to this configuration, the contact state detector individually detects the presence/absence of an AC current that flows from the external AC power supply to between one of the AC lines and the ground line, as well as between the other AC line and the ground line. Thus, welding of the relay contacts provided in the AC lines respectively can be detected.

It is also preferred that the charging monitor further have a welding determination part that detects the presence/absence of welding of each of the relay contact on the basis of the voltage detected by the contact state detector, and a control circuit that inhibits charging of the storage battery in the load section, when welding of either one of the relay contacts is detected by the welding determination part.

According to this configuration, when the welding determination part detects welding of either one of the relay contacts, charging of the storage battery in the load section can be inhibited, whereby the safety of charging the storage battery can be improved.

The invention claimed is:

1. A charging monitor, comprising:
    a switch that is disposed between a load section having a storage battery and an external AC power supply supplying a current to the load section via a plurality of lines and interrupts the supply of the current from the external AC power supply to the load section;
    a current detection circuit that outputs a detection signal corresponding to a difference in level between currents flowing through the lines;
    a suppression circuit that suppresses a DC component contained in the detection signal;
    a filter circuit that filters a plurality of frequency components contained in the detection signal so that attenuation increases as a frequency becomes high;
    a rectifier smoothing circuit that rectifies and smoothens an output signal obtained when the detection signal passes through the filter circuit and the suppression circuit; and
    an electric leakage determination circuit that detects an electric leakage and shuts off the switch when the level of the signal smoothened by the rectifier smoothing circuit exceeds a preset reference level,
    wherein the frequency characteristic of the filter circuit is set such that a frequency characteristic of an entire path that reaches the electric leakage determination circuit via the filter circuit, the suppression circuit and the rectifier smoothing circuit corresponds to the relationship between a frequency of a current flowing through a human and a current value perceived by the human.

2. The charging monitor according to claim 1, wherein
a frequency characteristic of the filter circuit is set so as to correspond to a relationship between a frequency of the current flowing through a human body and a current value perceived by the human.

3. The charging monitor according to claim 1,
wherein in the filter circuit,
a first input terminal is connected to a first output terminal via a first resistor,
a series circuit composed of a first capacitor and a second resistor is connected between a second output terminal connected to a second input terminal and the first output terminal,
the filtered signal by the filter circuit is output between the first and second output terminals, and
the current detection circuit outputs the detection signal between the first and second input terminals.

4. A charging monitor, comprising:
a switch that is disposed between a load section having a storage battery and an external AC power supply supplying a current to the load section via a plurality of lines and interrupts the supply of the current from the external AC power supply to the load section;
a current detection circuit that outputs a detection signal corresponding to a difference in level between currents flowing through the lines;
a suppression circuit that suppresses a DC component contained in the detection signal;
a filter circuit that filters a plurality of frequency components contained in the detection signal so that attenuation increases as a frequency becomes high;
a rectifier smoothing circuit that rectifies and smoothens an output signal obtained when the detection signal passes through the filter circuit and the suppression circuit; and
an electric leakage determination circuit that detects an electric leakage and shuts off the switch when the level of the signal smoothened by the rectifier smoothing circuit exceeds a preset reference level,
wherein in the filter circuit,
a first input terminal is connected to a first output terminal via a first resistor,
a series circuit composed of a first capacitor and a second resistor is connected between a second output terminal connected to a second input terminal and the first output terminal,
the filtered signal by the filter circuit is output between the first and second output terminals, and
the current detection circuit outputs the detection signal between the first and second input terminals, and
wherein the frequency characteristic of the filter circuit is set such that a frequency characteristic of an entire path that reaches the electric leakage determination circuit via the filter circuit, the suppression circuit and the rectifier smoothing circuit corresponds to the relationship between a frequency of a current flowing through a human and a current value perceived by the human.

5. The charging monitor according to claim 1,
wherein the suppression circuit is a DC component cut circuit for interrupting the DC component.

6. The charging monitor according to claim 1,
wherein the current detection circuit is a zero-phase-sequence current transformer that has a detection coil wound around a circular core.

7. The charging monitor according to claim 6,
wherein the suppression circuit is a circuit in which both terminals of the detection coil are connected to a ground via resistors respectively.

8. The charging monitor according to claim 6, further comprising:
a differential amplifier circuit that amplifies a difference voltage between each terminal of the detection coil and the ground.

9. A charging monitor, comprising:
a switch that is disposed between a load section having a storage battery and an external AC power supply supplying a current to the load section via a plurality of lines and interrupts the supply of the current from the external AC power supply to the load section;
a current detection circuit that outputs a detection signal corresponding to a difference in level between currents flowing through the lines;
a suppression circuit that suppresses a DC component contained in the detection signal;
a filter circuit that filters a plurality of frequency components contained in the detection signal so that attenuation increases as a frequency becomes high;
a rectifier smoothing circuit that rectifies and smoothens an output signal obtained when the detection signal passes through the filter circuit and the suppression circuit; and
an electric leakage determination circuit that detects an electric leakage and shuts off the switch when the level of the signal smoothened by the rectifier smoothing circuit exceeds a preset reference level,
wherein the current detection circuit is a zero-phase-sequence current transformer that has a detection coil wound around a circular core, and
the plurality of lines include one ground line and two AC lines,
the switch has relay contacts for individually opening/closing the two AC lines,
a sub-ground line splitting from the ground line and the two AC lines are inserted into the circular core of the current detection circuit, on a side closer to the external current power supply than the switch,
the charging monitor further has a contact state detector that detects a voltage between each of the AC lines and the sub-ground line inserted into the core, on the side closer to the storage battery than the switch in a state where the switch is opened, and
the contact state detector returns an AC component of a current flowing out of each of the AC lines from the sub-ground line to the ground line via the core.

10. The charging monitor according to claim 9,
wherein the contact state detector has, at an input stage thereof, a DC component interrupting circuit that interrupts a DC component of each of the AC lines.

11. The charging monitor according to claim 10,
wherein the contact state detector has two voltage monitor circuits, each of which detects a voltage between each of the AC lines and the sub-ground line inserted into the core, and
in each of the voltage monitor circuit circuits, each of the AC lines is connected to a voltage detection circuit via a third capacitor, a third resistor and a diode, a connection point between the third resistor and the diode is connected to the sub-ground line via a fourth resistor, and a connection point between the diode and the voltage detection circuit is connected to the sub-ground line via a fourth capacitor.

12. The charging monitor according to claim 1, wherein
the plurality of lines include two AC lines, the charging monitor further has a contact state detector that detects a voltage between the AC lines closer to the storage battery than the switch when an instruction is sent to bring the switch into an opened state, and the contact state detector has, at an input stage thereof, a DC component interrupting circuit for interrupting a DC component.

13. The charging monitor according to claim 12,
wherein the switch has relay contacts that individually open/close the two AC lines, and
the contact state detector has a circuit that detects a voltage between each of the AC lines and a ground line.

14. The charging monitor according to claim 9, further comprising:
a welding determination part that detects the presence/absence of welding on each of the relay contacts on the basis of the voltage detected by the contact state detector, and
a control circuit that inhibits charging of the storage battery in the load section, when welding on either one of the relay contacts is detected by the welding determination part.

15. The charging monitor according to claim 13, further comprising:
a welding determination part that detects the presence/absence of welding on each of the relay contacts on the basis of the voltage detected by the contact state detector, and
a control circuit that inhibits charging of the storage battery in the load section, when welding on either one of the relay contacts is detected by the welding determination part.

16. A charging monitor, comprising:
a switch that is disposed between a load section having a storage battery and an external AC power supply supplying a current to the load section via a plurality of lines and interrupts the supply of the current from the external AC power supply to the load section;
a current detection circuit that outputs a detection signal corresponding to a difference in level between currents flowing through the lines;
a suppression circuit that suppresses a DC component contained in the detection signal;
a filter circuit that filters a plurality of frequency components contained in the detection signal so that attenuation increases as a frequency becomes high;
a rectifier smoothing circuit that rectifies and smoothens an output signal obtained when the detection signal passes through the filter circuit and the suppression circuit; and
an electric leakage determination circuit that detects an electric leakage and shuts off the switch when the level of the signal smoothened by the rectifier smoothing circuit exceeds a preset reference level,
wherein the plurality of lines include one ground line and two AC lines,
the switch has relay contacts for individually opening/closing the two AC lines,
a sub-ground line splitting from the ground line and the two AC lines are inserted into a circular core of the current detection circuit, on a side closer to the external current power supply than the switch,
the charging monitor further has a contact state detector that detects a voltage between each of the AC lines and the sub-ground line inserted into the core, on the side closer to the storage battery than the switch in a state where the switch is opened, and
the contact state detector returns an AC component of a current flowing out of each of the AC lines from the sub-ground line to the ground line via the core.

17. The charging monitor according to claim 16,
wherein the contact state detector has, at an input stage thereof, a DC component interrupting circuit that interrupts a DC component of each of the AC lines.

18. The charging monitor according to claim 17,
wherein the contact state detector has two voltage monitor circuits, each of which detects a voltage between each of the AC lines and the sub-ground line inserted into the core, and
in each of the voltage monitor circuits, each of the AC lines is connected to a voltage detection circuit via a third capacitor, a third resistor and a diode, a connection point between the third resistor and the diode is connected to the sub-ground line via a fourth resistor, and a connection point between the diode and the voltage detection circuit is connected to the sub-ground line via a fourth capacitor.

19. The charging monitor according to claim 16 further comprising:
a welding determination part that detects the presence/absence of welding on each of the relay contacts on the basis of the voltage detected by the contact state detector, and
a control circuit that inhibits charging of the storage battery in the load section, when welding on either one of the relay contacts is detected by the welding determination part.

* * * * *